Figure 1:
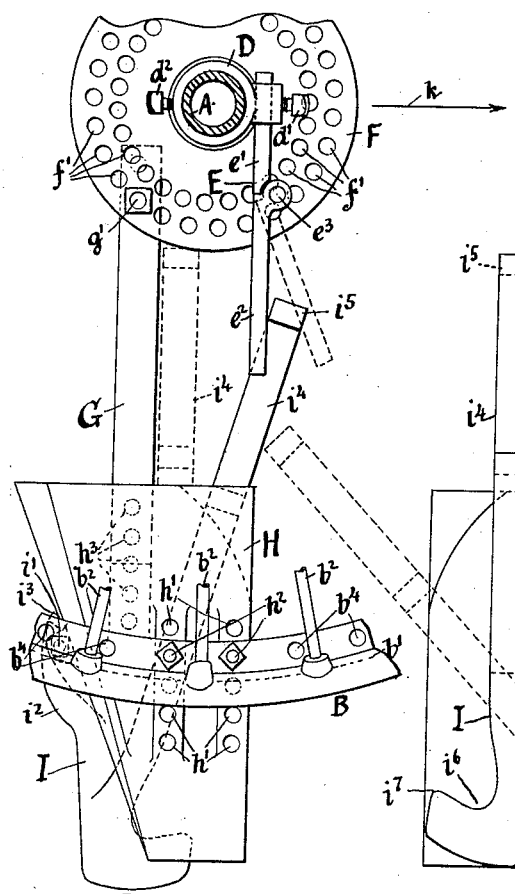

J. RIEMENSCHNEIDER.
PLANT HOLDER FOR PLANT SETTING MACHINES.
APPLICATION FILED DEC. 4, 1908.

1,092,454.

Patented Apr. 7, 1914.

Julius Riemenschneider, Inventor

UNITED STATES PATENT OFFICE.

JULIUS RIEMENSCHNEIDER, OF MILWAUKEE, WISCONSIN.

PLANT-HOLDER FOR PLANT-SETTING MACHINES.

1,092,454.  Specification of Letters Patent.  Patented Apr. 7, 1914.

Application filed December 4, 1908. Serial No. 465,951.

*To all whom it may concern:*

Be it known that I, JULIUS RIEMENSCHNEIDER, of Milwaukee, Wisconsin, have invented a Plant-Holder for Plant-Setting Machines, of which the following is a specification.

By the present invention I aim to provide an improved form of plant-holder or plant-setting box for use in the machine previously invented by me and described and claimed in my copending application No. 323,831, filed June 28, 1906. In said application I showed a plant-wheel adapted to roll along the ground and carrying projecting plant-boxes on its periphery, the wheel having sufficient weight to force the plant-boxes into the ground up to the level of the wheel-rim, and thus acting as a gage to produce an even and regular setting of the plants independently of the varying character of the ground over which the machine passes. In the construction of the machine as previously described, however, I have found that the plant-boxes or holders, in which the plants are placed successively as the wheel turns by an operator riding on the machine, while they act successfully to dig the hole in which the plant is to be placed and in placing the plant in the hole, do not satisfactorily cover in the plant with earth, whereby the plants are not held upright after the machine is passed and it becomes necessary to go over the work with a hoe after the plants are set. In my present invention I aim to avoid this difficulty by producing an improved form of plant-holder adapted not only to hold the plant, dig the hole and set the plant therein, but also to cover in the plant with earth and leave it standing properly covered in and in a vertical position. In pursuance of this object the principle of my invention is embodied in a box or holder having a pointed or wedge-shaped end, in the acute angle of which the plant rests; and one side of said box being movable and provided with means for moving it away as the plant reaches its proper position in the ground, so that the plant is left upon the ground in the position in which it was placed.

My invention further comprises means whereby, in the setting of the plant, and before the removal of the movable side as a support thereof, the earth is caused to fall into the holder above the root and thus act as a covering preliminary to the actual setting of the plant.

Further my invention comprises means carried by the movable side whereby, as it moves in the aforesaid manner, the earth so falling into the holder is pressed and packed around the root.

The invention further comprises means whereby the trip-rod acting to operate the plant-holder to release the plant is caused to yield when struck from behind, so as to permit of the wheel turning backwardly without interference therefrom, which is not always possible with a rigid rod.

Figure 2:
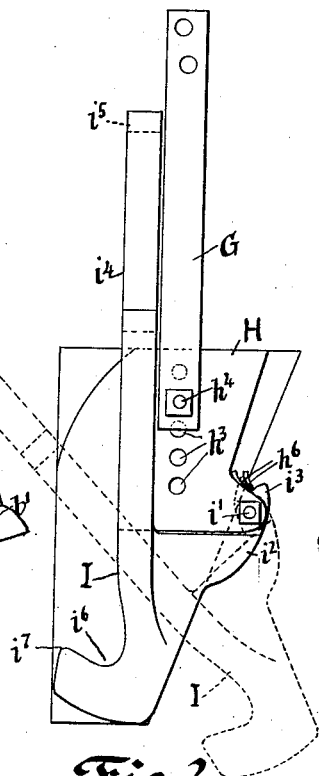
Figure 3:
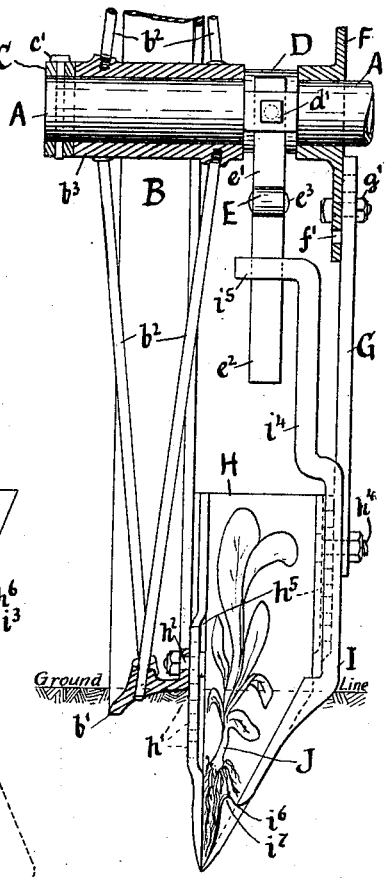
Figure 4:
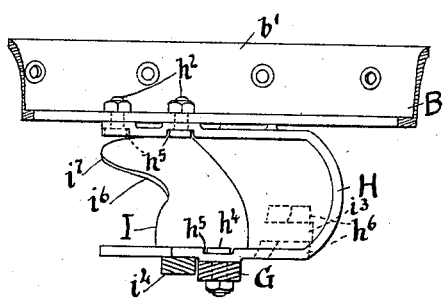

The nature of my invention will best be understood from a consideration of the following detailed description of the most improved form thereof, taken in connection with the accompanying drawings, wherein, Figure 1 is a side elevation of a portion of a wheel carrying a plant-box or holder and the parts accessory thereto; Fig. 2 is a side elevation of the plant-box separately, from the opposite side; Fig. 3 is a front elevation of the same, in position ready for discharging the plant, showing the wheel in section; and Fig. 4 is a plan view of the plant-holder and a portion of the wheel-rim.

In these drawings every reference letter and numeral refers always to the same part.

The tubular axle A and wheel B comprising the rim $b'$, spokes $b^2$ and hub $b^3$ turning on said axle; the end-thrust collar C movably secured by the pin $c'$; the collar D holding the trip-rod E by means of a set screw $d'$ and secured to the axle A by a set screw $d^2$ or other means; and the disk F turning on the axle A and having a plurality of holes $f'$ in its periphery for the securing thereto of the brace-rod G by bolts $g'$, are all substantially identical in form and function with similar parts shown in my aforesaid application, and, while here shown by way of illustration, are not essential to the subject-matter of the present invention. As in aforesaid application, said wheel-rim $b'$ is also here shown as provided with a plurality of equably spaced bolt-holes $b^4$ for the securing thereto of the plant-box or plant-holder H, which is provided on the side adjacent to the wheel-rim with two vertical rows of bolt-holes $h'$ spaced according to the bolt-holes $b^4$ for the adjustable securing of the box to the rim by means of bolts $h^2$. Similarly on the opposite side there is provided a vertical row of bolt-holes $h^3$ for securing the box adjustably to the supporting-rod G by means of a bolt $h^4$. It will be observed that the box H is of trough-shaped form with a sloping back, and the heads of the bolts $h^2$, $h^4$ are preferably set flush with the interior faces of the box-sides, longitudinal grooves $h^5$ being provided for that purpose. Both sides of the plant-box stand in vertical planes but the bottom is cut off obliquely beginning with a point opposite the wheel-rim on the side distant therefrom, so that the box tapers to a point at the bottom. As a closure for this open bottom I provide a swinging-member I pivoted upon a pin $i'$ carried by ears $h^6$ on the back of the plant-box, said bolt $i'$ passing through a lug $i^2$ which has a shoulder $i^3$ adapted to strike the back of the box when the member I has turned into the position shown in dotted lines in Fig. 2, and limit it against further movement in that direction. The member I has an upstanding bar or extension $i^4$ the upper end of which is bent horizontally as shown at $i^5$ so as to lie in the path of the trip-rod E, whereby as the wheel turns the trip-rod strikes the horizontal portion $i^5$ and swings the member I in the manner illustrated by the full-line position in Fig. 1 and the dotted-line position in Fig. 2, so that the lower portion thereof clears the bottom of the plant-box and allows the plant J to rest upon the ground in the hole which the pointed end of the plant-box has dug. The lower end of the member I is of peculiar formation which constitutes an important element of this invention. It will be observed that the material thereof is cut away as shown at $i^6$; as the plant-box enters the ground, the earth on the sides of the hole falls in over the depression $i^6$ and thus covers the root of the plant while still in the holder. Of course the amount of cutting out of the depression $i^6$ will depend on the size of the plant; for small plants it will be more cut out than for large plants. Furthermore the tip end $i^7$ is turned inwardly as clearly shown in Fig. 3, so that the earth which has fallen into the holder is pressed up around the root of the plant as the member I is swung open. The back of the box is made sloping in order that the box itself may clear the plant while rising from the ground and may not pull it over as would be the case if it were left radial to the wheel. It will be seen on considering the motion of the wheel in a forward direction (indicated by the arrow $k$ in Fig. 1) that as the box rises from the ground after setting the plant, carried by the wheel-rim, it will gradually change its angle to the vertical, so that as it clears the ground the back will be vertical or nearly so, its actual angle with the vertical depending of course on the diameter of the wheel.

I have herein shown the trip-rod E in two parts $e'$ and $e^2$ pivoted together by a pin $e^3$ in such a manner as to provide for the yielding of the lower member $e^2$ when struck from behind as shown by the dotted-line position in Fig. 1. This construction is useful in enabling the wheel to be turned backwardly without interference from the trip-rod, in case the bar $i^4$ of the plant-box should be in interfering position; but this construction is, in practice, unnecessary because the center of gravity of the member I is so placed that in turning backward the member I will naturally hang in the dotted-line position of Fig. 2 until after it has passed under the trip-rod. There is sufficient friction of movement, especially when in contact with the ground, to prevent its turning into this position on the advance movement of the wheel until struck by the trip-rod.

While I have hereinabove shown the most improved form of my invention, I wish it understood that not all of the features are essential thereto or necessarily made in the exact form shown, but various changes and modifications in the constructions as herein shown may be made without departing from the spirit of my invention, and I wish it understood therefore that the latter is not otherwise limited than by the reasonable scope of my claims. It will be understood moreover that while I have illustrated my invention in application to my aforesaid plant-setting machine, to which it is particularly adapted, I do not consider its use confined thereto, as it may also be usable in connection with other plant-setting machines.

Having thus described my invention, what I claim as new and desire to secure by Letters Patent is:

1. A plant-setting device adapted to turn about an axis and comprising a trough-shaped box adapted to be set radially with respect to said axis and to contain the plant, the back of said box constituting the bottom of the trough and sloping backwardly with respect to the radius of rotation passing through said box, whereby the plant resting therein is first set in a backwardly sloping position and brought up to the vertical by the change of angle of said box as it rotates in rising from the ground.

2. A plant-setting device comprising a trough-shaped box adapted to be mounted in substantially radial position on a wheel and projecting therefrom so as to be adapted to dig a hole in the ground, the projecting end of said box tapering to a wedge-shaped extremity and one side thereof being movable whereby after digging the hole, said movable side may be removed to leave the plant in the ground.

3. A plant-setting device comprising a trough-shaped box adapted to be mounted in substantially radial position on a wheel and projecting therefrom so as to be adapted to dig a hole in the ground, the projecting end of said box tapering to a wedge-shaped extremity and one side thereof being movable whereby after digging the hole, said movable side may be removed to leave the plant in the ground; and one side of said box having a lateral reëntrancy between said wedge-shaped extremity and the top of the projecting portion, wherethrough the earth falls and thus covers the roots of the plant.

4. A plant-setting device comprising a trough-shaped box adapted to be mounted in substantially radial position on a wheel and projecting therefrom so as to be adapted to dig a hole in the ground, the projecting end of said box tapering to a wedge-shaped extremity and one side thereof being pivoted with respect to the box about an axis perpendicular to the plane of movement thereof.

5. A plant-holding device comprising a trough-shaped box adapted to be secured to a wheel in a substantially radial position so that one end projects therefrom; one side of said box being substantially plane and lying in the plane of movement of the wheel and the lower part of the opposite side of said box being edgewise movable in a plane parallel to the first and having its lower end corresponding to the projecting portion of said box obliquely converging toward the first-named side and meeting the latter in a wedge-shaped point thus forming an oblique removable bottom to said box.

6. A plant-setting device comprising a trough-shaped box adapted to be mounted in substantially radial position on a wheel and projecting therefrom so as to be adapted to dig a hole in the ground, the projecting end of said box tapering to a wedge-shaped extremity and one side thereof being pivoted with respect to the box about an axis perpendicular to the plane of movement thereof, one side of this box having a lateral reëntrancy and there being further on the side of said box in front of said reëntrancy an inwardly-directed tip adapted to press the earth falling in through the reëntrancy against the roots of the plant.

7. A plant-holding device comprising a trough-shaped box adapted to be secured to a wheel in a substantially radial position so that one end projects therefrom; one side of said box being substantially plane and lying in the plane of movement of the wheel and the lower part of the opposite side of said box being edgewise movable in a plane parallel to the first and having its lower end corresponding to the projecting portion of said box obliquely converging toward the first-named side and meeting the latter in a wedge-shaped point thus forming an oblique removable bottom to said box; and the oblique portion having a reëntrancy through which the earth falls as the plant is being set.

8. A plant-holding device comprising a trough-shaped box adapted to be secured to a wheel in a substantially radial position so that one end projects therefrom; one side of said box being substantially plane and lying in the plane of movement of the wheel and the lower part of the opposite side of said box being edgewise movable in a plane parallel to the first and having its lower end corresponding to the projecting portion of said box obliquely converging toward the first-named side and meeting the latter in a wedge-shaped point thus forming an oblique removable bottom to said box; and the oblique portion having a reëntrancy through which the earth falls as the plant is being set, and further an inwardly-turned tip beyond said reëntrancy which is adapted to compress the earth so falling in against the roots of the plant.

9. A plant-holding device comprising a trough-shaped box adapted to be secured to a wheel in a substantially radial position so that one end projects therefrom; one side of said box being substantially plane and lying in the plane of movement of the wheel and the lower part of the opposite side of said box being edgewise movable in a plane parallel to the first and having its lower end corresponding to the projecting portion of said box obliquely converging toward the first-named side and meeting the latter in a wedge-shaped point thus forming an oblique removable bottom to said box; the back of said box being further formed to slope backwardly with respect to the radius of rotation thereby enabling it to clear the top of the plant as the box is rising from the ground.

10. The combination with a wheel of a plant-setting device comprising a trough-shaped box which is secured in substantially radial position to the rim thereof having a projecting wedge-shaped end adapted to dig a hole in the ground and a backwardly-sloping back.

11. The combination with a wheel of a plant-setting device comprising a trough-shaped box which is secured in substantially radial position to the rim thereof having a projecting wedge-shaped end adapted to dig a hole in the ground and a backwardly sloping back; the lower portion of one side of said box being edgewise movable.

12. The combination with a wheel of a plant-setting device comprising a trough-shaped box which is secured in substantially radial position to the rim thereof having a projecting wedge-shaped end adapted to dig a hole in the ground and a backwardly-sloping back, the lower portion of one side of said box being edgewise movable; in conjunction with a stationary trip and a projecting arm on said movable member adapted to strike said trip and to be moved away from its normal position as and after said box reaches its setting position.

13. In a plant-setting machine, the combination with a wheel adapted to roll along the ground resting thereupon of a plant-setting device comprising a trough-shaped box mounted on the rim thereof in substantially radial position and having one end thereof projecting and brought to a tapering wedge-shaped extremity, whereby it is adapted to dig a hole in the ground, one side of said box being pivoted upon the box about an axis perpendicular to the plane of movement of the wheel, and means for turning said pivoted side about its pivot when said box reaches the setting position and thereby delivering the plant into the hole dug by the box.

14. In a plant-setting machine, the combination with a wheel adapted to roll along the ground resting thereupon of a plant-setting device comprising a trough-shaped box mounted on the rim thereof in substantially radial position and having one end thereof projecting and brought to a tapering wedge-shaped extremity, whereby it is adapted to dig a hole in the ground, one side of said box being pivoted upon the box about an axis perpendicular to the plane of movement of the wheel, and means for turning said pivoted side about its pivot when said box reaches the setting position and thereby delivering the plant into the hole dug by the box, the back of said box having a backward slope enabling it to clear the top of the plant as it rises from the ground.

15. In a plant-setting machine, the combination with a wheel adapted to roll along the ground resting thereupon of a plant-setting device comprising a trough-shaped box mounted on the rim thereof in substantially radial position and having one end thereof projecting and brought to a tapering wedge-shaped extremity, whereby it is adapted to dig a hole in the ground, one side of said box being pivoted upon the box about an axis perpendicular to the plane of movement of the wheel, and means for turning said pivoted side about its pivot when said box reaches the setting position and thereby delivering the plant into the hole dug by the box, said movable side having a reëntrancy above its lower end enabling the earth to fall therethrough over the roots of the plant, and said movable side having further an inwardly-directed tip which is adapted to compress the earth so falling over the roots as the side turns upon its pivot.

16. In a plant-setting machine, the combination with a wheel adapted to roll along the ground resting thereupon of a plant-setting device comprising a trough-shaped box mounted on the rim thereof in substantially radial position and having one end thereof projecting and brought to a tapering wedge-shaped extremity, whereby it is adapted to dig a hole in the ground, the side adjacent to said wheel being substantially plane and lying parallel to the plane of movement of the wheel; the back of said box sloping backwardly with respect to the radius; and the projecting portion of the other lateral side converging obliquely toward said first-named side and meeting it in a wedge-shaped extremity and being pivoted upon an axis perpendicular to the plane of movement and having an arm projecting toward the axis of the wheel; in conjunction with a trip-device adapted to strike said projecting-arm as the box comes to the setting-position and thereby turn said movable portion about its pivot and thereby deliver the plant into the hole dug by said device.

17. In a plant-setting machine, the combination with a wheel adapted to roll along the ground resting thereupon of a plant-setting device comprising a trough-shaped box mounted on the rim thereof in substantially radial position and having one end thereof projecting and brought to a tapering wedge-shaped extremity, whereby it is adapted to dig a hole in the ground, the side adjacent to said wheel being substantially plane and lying parallel to the plane of movement of the wheel; the back of said box sloping backwardly with respect to the radius; and the projecting portion of the other lateral side converging obliquely toward said first-named side and meeting it in a wedge-shaped extremity and being pivoted upon an axis perpendicular to the plane of movement and having an arm projecting toward the axis of the wheel, said movable portion having a reëntrancy above its lower end which admits the earth into the box around the roots of the plant, and an inwardly directed tip which compresses said earth upon said roots as said movable portion turns upon its pivot; in conjunction with a trip-device adapted to strike said projecting-arm as the box comes to the setting-position and thereby turn said movable portion about its pivot and thereby deliver the plant into the hole dug by said device.

18. In a plant-setting machine, a wheel carrying one or more radially arranged boxes, each having a recess in which the plant lies, said recess being permanently open on the trailing face of the box whereby to receive and retain a plant on its descending motion and allow it to fall out on its ascending motion.

19. In a plant-setting machine, a wheel carrying one or more radially arranged boxes, each having a recess in which the plant lies, said recess being permanently open on the trailing face of the box whereby to receive and retain a plant on its descending motion and allow it to fall out on its ascending motion, the said boxes being extended beyond the rim of the wheel whereby to make a depression in the ground as the wheel turns into which the plant falls.

20. In a plant-setting machine, a wheel carrying one or more radially arranged boxes, each having a recess in which the plant lies, said recess being open on the trailing face of the box whereby to receive and retain a plant on its descending motion and allow it to fall out on its ascending motion, each box being provided with means for discharging the plant from it when at or near its lowest position.

21. In a plant-setting machine, the combination of a plant-holding box consisting of a channel-shaped trough one end of which is closed and whose outer surface is brought to a point whereby the end of the trough is enabled more easily to penetrate the ground, means for carrying said box through a cycle in which it is first presented with the open trough-side uppermost to receive a plant and thereafter moved into a vertical position and depressed in the ground, and means acting when said box is in said last-named position to discharge the plant therefrom.

22. In a plant-setting machine, the combination of a wheel, a plant-box set radially thereon projecting beyond the rim thereof and having a trough-shaped recess therein, a reciprocating member normally occupying one side of said recess and movable away from that side of said recess whereby the plant lying therein is freed from said recess, and means acting on said member to move it in the manner described as the box passes its lowermost position.

23. In a plant-setting machine, the combination of an axle, a plant-wheel, plant-setting devices mounted thereon, each plant-box having a movable element adapted to be operated by a trip, a stationary trip mounted on said axle, and means for adjustably moving said trip forward and back whereby the angular position at which the plant-boxes are operated thereby are varied.

In witness whereof I have hereunto set my hand this twenty-fourth day of November, 1908.

JULIUS RIEMENSCHNEIDER.

Witnesses:
GEORGE WETMORE COLLES,
MINNIE D. SCHIENBEIN.

---

Copies of this patent may be obtained for five cents each, by addressing the "Commissioner of Patents, Washington, D. C."